US012804366B2

(12) United States Patent
Chattaraj

(10) Patent No.: US 12,804,366 B2
(45) Date of Patent: Nov. 17, 2026

(54) VIDEO PRESENTATION DEVICE LINKED TO VIDEO CONTENT SOURCE VIA EMBEDDED CELLULAR RADIO

(71) Applicant: T-Mobile Innovations LLC, Overland Park, KS (US)

(72) Inventor: Surajit Chattaraj, Maple Valley, WA (US)

(73) Assignee: T-Mobile Innovations LLC, Overland Park, KS (US)

(*) Notice: Subject to any disclaimer, the term of this patent is extended or adjusted under 35 U.S.C. 154(b) by 342 days.

(21) Appl. No.: 18/416,716

(22) Filed: Jan. 18, 2024

(65) Prior Publication Data

US 2025/0240608 A1 Jul. 24, 2025

(51) Int. Cl.

| | |
|---|---|
| ***H04W 4/50*** | (2018.01) |
| ***H04B 7/06*** | (2006.01) |
| ***H04B 17/309*** | (2015.01) |
| ***H04W 8/18*** | (2009.01) |

(52) U.S. Cl.

CPC ............ *H04W 4/50* (2018.02); *H04B 7/0617* (2013.01); *H04B 7/063* (2013.01); *H04B 17/309* (2015.01); *H04W 8/18* (2013.01)

(58) Field of Classification Search

CPC ........ H04W 4/50; H04W 8/18; H04B 7/0617; H04B 7/063; H04B 17/309

USPC ...................................................... 455/414.1

See application file for complete search history.

(56) References Cited

U.S. PATENT DOCUMENTS

| | | | | |
|---|---|---|---|---|
| 9,031,537 | B2 * | 5/2015 | Ortiz | H04L 63/0861 455/411 |
| 10,063,331 | B2 * | 8/2018 | Daoura | H04W 4/06 |
| 10,277,734 | B2 * | 4/2019 | Hentschel | H04W 12/04 |
| 10,615,855 | B2 * | 4/2020 | Gao | H04B 7/0482 |
| 11,064,347 | B1 * | 7/2021 | Dreiling | H04W 12/043 |
| 11,140,543 | B1 * | 10/2021 | Indurkar | H04L 63/102 |
| 11,310,641 | B2 * | 4/2022 | Sicard | H04W 8/245 |
| 11,678,176 | B1 * | 6/2023 | Uehling | H04W 12/43 370/329 |

(Continued)

FOREIGN PATENT DOCUMENTS

| | | | | |
|---|---|---|---|---|
| CN | 209184819 U | * | 7/2019 | H04B 7/0413 |
| CN | 211791837 U | * | 10/2020 | H04B 7/0413 |
| CN | 113365117 B | * | 9/2024 | H04B 7/0413 |

*Primary Examiner* — Jean A Gelin

(57) ABSTRACT

A video presentation device having an embedded cellular radio. The device comprises a processor, a non-transitory memory, a cellular radio antenna, a cellular radio transceiver, a display screen, and an application, stored in the non-transitory memory. When executed by the processor, the application sends a network attach request message via the cellular radio transceiver and the cellular radio antenna to a cell site to request a cellular radio communication link from the cell site, wherein the network attach request message comprises credentials from an electronic subscriber identity module (eSIM) stored in the non-transitory memory and wherein the eSIM is associated with a cellular communication service subscription account; after attaching to the cell site, sends a video content request to a video content source via the cellular radio transceiver and the cellular radio antenna; receives the requested video content; and presents the requested video content on the display screen.

20 Claims, 6 Drawing Sheets

(56) References Cited

U.S. PATENT DOCUMENTS

| | | | | |
|---|---|---|---|---|
| 11,736,283 | B2 * | 8/2023 | Nix | H04W 4/70<br>713/168 |
| 2015/0058937 | A1 * | 2/2015 | Burckart | H04N 21/64322<br>709/219 |
| 2017/0289788 | A1 * | 10/2017 | Lalwaney | H04W 8/24 |
| 2017/0338962 | A1 * | 11/2017 | Li | H04L 69/326 |
| 2018/0052923 | A1 * | 2/2018 | Tudor | H04M 1/72436 |
| 2022/0132219 | A1 * | 4/2022 | Maria | H04N 21/63345 |
| 2022/0216600 | A1 * | 7/2022 | Kumar | H04W 24/02 |
| 2023/0179238 | A1 * | 6/2023 | Kutz | H04W 4/06<br>375/297 |
| 2023/0247415 | A1 * | 8/2023 | Liu | H04W 8/183<br>370/329 |
| 2023/0299481 | A1 * | 9/2023 | Tran | H04B 17/318<br>343/721 |
| 2024/0007848 | A1 * | 1/2024 | Chaugule | H04W 8/265 |

* cited by examiner

VIDEO PRESENTATION DEVICE LINKED TO VIDEO CONTENT SOURCE VIA EMBEDDED CELLULAR RADIO

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the early days of television, a few stations broadcast a pre-determined schedule of programs over a receiving area. All television sets in the given receiving area received the same programs, and if owners of television sets wanted to watch a program on their television set, they had to accommodate themselves to viewing the pre-determined programs at the pre-determined times. Today communication technology supports various forms of on-demand consumption of video programs. For example, owners of video presentation devices can enjoy on-demand access to a broad range of different video content at the times of their own choosing.

SUMMARY

In an embodiment, a video presentation device having an embedded cellular radio is disclosed. The device comprises a processor, a non-transitory memory, a cellular radio antenna, a cellular radio transceiver, a display screen, and an application stored in the non-transitory memory. When executed by the processor, the application sends a network attach request message via the cellular radio transceiver and the cellular radio antenna to a cell site to request a cellular radio communication link from the cell site, wherein the network attach request message comprises credentials from an electronic subscriber identity module (eSIM) stored in the non-transitory memory and wherein the eSIM is associated with a cellular communication service subscription account and, after attaching to the cell site, sends a video content request to a video content source via the cellular radio transceiver and the cellular radio antenna. The application further receives the requested video content, presents the requested video content on the display screen, and, in response to a prompt to release the eSIM, sends a network detach request message via the cellular radio transceiver and the cellular radio antenna to the cell site, wherein the application releases the eSIM and enables a second video presentation device to utilize the eSIM to attach to the cell site, to download video content, and to present video content based on the cellular communication service subscription account.

In another embodiment, a method of streaming video content to a video presentation device from a cell site is disclosed. The method comprises sending a network attach request message by a cellular radio of the video presentation device via an antenna of the video presentation device to a cell site, wherein the network attach request message comprises credentials from an electronic subscriber identity module (eSIM) stored in a non-transitory memory of the video presentation device and, after attaching to the cell site, conducting an antenna beam adaptation session by the cellular radio of the video presentation device, wherein the cellular radio directs and focuses a beam of the antenna of the video presentation device towards the cell site. The method further comprises storing a plurality of antenna beam adaptation parameters established during the antenna beam adaptation session by an application executing on a processor of the video presentation device in the non-transitory memory of the video presentation device and, after storing the antenna beam adaption parameters, detaching from the cell site. The method further comprises receiving by the application a first user request to present a specific video content; in response to the first user request, configuring the antenna of the video presentation device based on the antenna beam adaptation parameters; in response to the first user request, attaching to the cell site by the cellular radio of the video presentation device based on the credentials from the eSIM; sending a video content request by the cellular radio of the video presentation device via the antenna to the cell site; receiving a video content by the cellular radio of the video presentation device via the antenna from the cell site; and presenting the video content on a display screen of the video presentation device.

In yet another embodiment, a method of streaming video content to a video presentation device from a cell site is disclosed. The method comprises sending a network attach request message by the video presentation device to a cell site to request a cellular radio communication link from the cell site, wherein the network attach request message comprises credentials from an electronic subscriber identity module (eSIM) stored in the non-transitory memory of the video presentation device, wherein the eSIM is associated with a video streaming cellular communication service subscription account, and wherein the video presentation device is not configured to respond to cellular paging messages and, after attaching to the cell site, sending a video content request by the video presentation device to a video content source via the cell site. The method further comprises receiving the requested video content by the video presentation device from the video content source via the cell site and presenting the requested video content by the video presentation device on a display of the video presentation device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
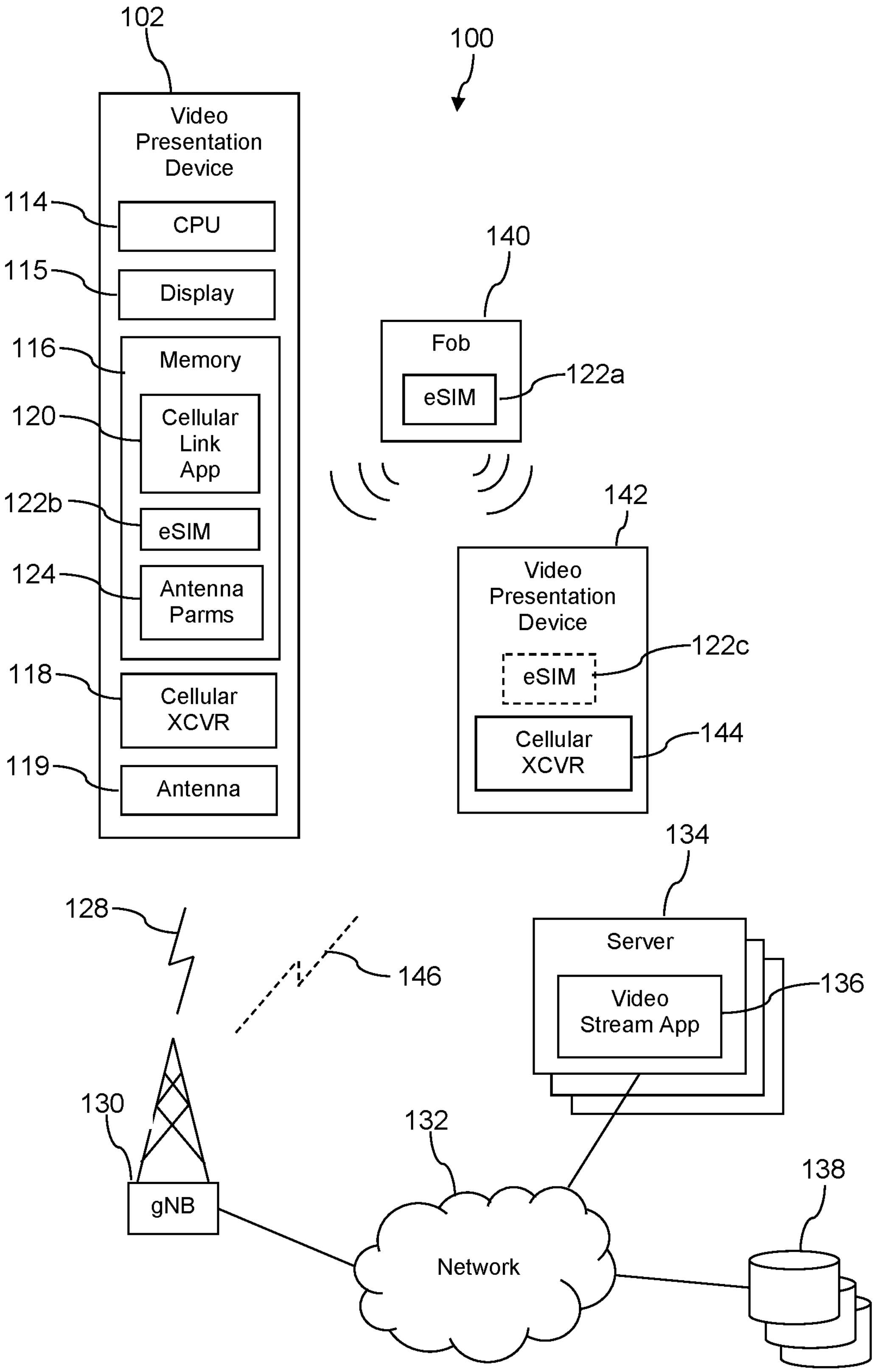
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a video presentation device configured to receive streaming video via a cellular radio link from a cell site of a cellular communication network. A user having a video streaming service account with a cellular communication service provider may obtain an embedded subscriber identity module (eSIM) or other bundle of radio access network (RAN) authentication/authorization credentials. This eSIM may be stored in a memory of the video presentation device. When the video presentation device is turned on and a user requests to view streaming video content, the video presentation device uses the eSIM or other credentials to attach to a cell site of the cellular communication service provider. After the cell site and/or the cellular communication network authenticates and/or authorizes the video presentation device, the video presentation device can send a request to one or more video content servers via the cell site and receive streamed video content. The video presentation device presents the video content on a display screen of the video presentation device for the enjoyment of the user.

A plurality of benefits and advantages accrue from this novel system and method that are related to the specialized use that the video communication device makes of the wireless communication link. For example, the video communication device need not support paging, and thus, the cellular network is not burdened with providing paging service for the device. This benefit has multiple aspects to it including not needing to support HLR/VLR services associated with the video communication device. Additionally, because the video presentation device is stationary (e.g., located in a fixed location for an extended period of within a residence, an enterprise, a government office, or a business), the cellular communication network need not provide mobility management service to the video presentation device and not provide hand-over support. When the video presentation device is turned off, the video presentation device expressly detaches from the cellular communication network, obviating the need for on-going handshaking between an idle device and the cell site.

In an embodiment, the video presentation device comprises a beam forming antenna. When the video presentation device is initially installed at a given location (e.g., in a residence), it conducts an antenna beam adaptation process and stores the resultant antenna parameters for future use. For example, the video presentation device turns on, determines it desirably should conduct an antenna beam adaptation process, and first rotates a broad beam 360 degrees to locate what is deemed the best serving cell site, for example the cell site of the cellular communication service provider with which the user has a video streaming service subscription that has the greatest received signal strength at the video presentation device. The video presentation device then focuses the antenna beam more narrowly towards the selected cell site and dithers the antenna beam within a narrower range to more precisely locate the cell site. At the completion of the antenna beam adaptation process, the video presentation device will have discovered and saved antenna beam forming parameters that it will using going forwards to focus its antenna beam tightly and narrowly at the selected cell site. It is understood that the tightness of the antenna beam of the video presentation device entails a concomitant increase of antenna gain in the direction of the cell site. The consequence of this process is that, when the video presentation device is engaged in receiving a video stream from a video content server via the cell site, the cell site can transmit this streamed video signal with a lower radio transmission power level, which conserves power and energy at the cell site as well as reducing radio interference in the area. Therefore, the system and method disclosed herein contributes to mitigating climate change by reducing the emission of greenhouse gases that would otherwise be produced to generate the electricity that a less efficient radio system would have consumed.

The system and method described herein provide security advantages as well. The cell site can apply rigorous and substantially unhackable authentication/authorization to the cellular link between the video presentation device and the cell site, whereby to prevent fraudulent access to video streaming services. The low radio signal strength that the cell site is able to transmit to the video presentation device, as a consequence of the antenna beam forming adaptation of the video presentation device, also raises the bar for a prospective fraudster intercepting and using the video streaming service without a video streaming subscription account.

The general usage pattern of cellular voice call traffic and video streaming are complementary, which is a further advantage of the system and method described herein. That is, the preponderance of voice traffic in the RAN occurs during business hours 9 am to 5 pm. By contrast, the preponderance of video streaming occurs outside of business hours. Thus, there is not expected to be a need to deploy additional RAN resources to support the new video streaming service, and in fact the piggy-backing of video streaming service on the RAN can help to amortize the expenses of the RAN. With reference to the core network, some of the virtual servers that are purposed for providing voice traffic related virtual network functions during business hours can be repurposed outside of business hours to providing functions associated with the video streaming capability.

In an embodiment, it is contemplated that a subscriber to the video streaming service would have a device that stores the eSIM or other authentication/authorization credential bundle, such as a small fob device. This fob could communicate with a first video presentation device in a location, for example via near field communication, to communicate and/or enable the eSIM to the video presentation device. If the fob leaves the proximity of the video presentation device, the eSIM stored in the video presentation device may be deleted from the device's memory or simply disabled, for example by a cellular radio communication link application that executes on a processor of the video presentation device. In an embodiment, the fob may be configured to authenticate a user by receiving a biometric signature input from the user and comparing it to a stored authorized biometric signature associated with the user, for example a thumbprint, an image of a face, a voiceprint, or other biometric signature. In an embodiment, the functionality of the fob described above could be provided by a smart phone or a wearable computer such as a smart watch.

If the user then carries the fob to the proximity of a second video presentation device, the fob may communicate with the second video presentation device, via near field communication or otherwise, and download and/or enable the eSIM for use by the second video presentation device. The second video presentation device, for example, may be located within the same private home. The first video presentation device may be in a living room of the home, and the second video presentation device may be in a bedroom of the home. A third video presentation device may be located in an upstairs sewing room of the home. A fourth video presentation device may be located in a garage/woodworking shop of the home. By carrying the fob to the proximity of these several different video presentation devices, the single cellular communication subscription account may be used to stream video via any one of these several video presentation devices. The cell site need not be aware of which specific video presentation device is actually receiving a wireless communication link from the cell site. The functionality of the system prevents more than one video presentation device establishing a cellular communication link at one time (there is only one eSIM, hence only one link).

In an embodiment, in addition to the video streaming over a cellular radio link functionality described above and described more fully hereinafter, the video presentation device may also provide conventional television functionality based on receiving program content via a conventional TV antenna and/or receiving program content via a cable service. The video presentation device may receive program content from a cable box receiving cable service, wherein the cable box is connected to the video presentation device via a cable (e.g., HDMI cable) or a short-range wireless radio signal (e.g., a WiFi signal). The video presentation device may receive a video input from a DVD player. In an embodiment, the video presentation device may comprise a flat screen display or other display screen. The video presentation device may receive electric power via an electric power plug connected to AC mains. The video presentation device may receive user input via a user interface such as one or more buttons disposed on the device and/or via a remote-control device, for example via optical signals (e.g., infrared) and/or short-range wireless signal.

Turning now to FIG. 1, a system 100 is described. In an embodiment, system 100 comprises a video presentation device 102. The video presentation device 102 comprises a processor 114, a display 115, a non-transitory memory 116, a cellular radio transceiver 118, and an antenna 119. In some contexts, the cellular radio transceiver 118 may be said to be embedded in the video presentation device 102. In an embodiment, the non-transitory memory may comprise a cellular radio communication link application 120, an eSIM **122*b*, and antenna parameters 124. In the interests of concision, the cellular radio communication link application 120 may be referred to simply as the link application 120. It is understood that the video application 120, the eSIM 122*b*, and the antenna parameters 124 may be installed in the non-transitory memory after manufacturing of the video presentation device 102, for example at the point of retail sale or after the video presentation device is installed in a final use location. While the description below speaks of the eSIM 122*b*, it is understood that in a different embodiment, the role of the eSIM 122*b* may be played instead by a traditional removable subscriber identity module (SIM) card that may be inserted into and removed from a receiving slot of the video presentation device 102. In an embodiment, a traditional removable SIM card may be installed under a removable panel or cover of the video presentation device 102 and be snapped into contact with electrical leads and the panel or cover reinstalled. In an embodiment, the display 115 may provide a viewing area of at least 550 square inches and less than 80,000 square inches; at least 550 square inches and less than 40,000 square inches; at least 550 square inches and less than 20,000 square inches; at least 550 square inches and less than 15,000 square inches; or at least 550 square inches and less than 10,000 square inches. For example, the display 115** may have a viewing area at least as large as 32 inches wide by 18 inches high and less than 144 inches wide by 81 inches high.

The video presentation device 102 (e.g., using the cellular radio transceiver 118 and the antenna 119) can establish a first cellular radio communication link 128 with a cell site 130. In an embodiment, the cell site may provide the first cellular radio communication link 128 according to a 6G, a 5G, a long-term evolution (LTE), a code division multiple access (CDMA), a global system for mobile communication (GSM), or other cellular radio communication protocol. In an embodiment, the cell site 130 may be operated by a cellular communication service provider and may be part of a radio access network (RAN) built and maintained by the cellular communication service provider. The cell site 130 is able to communicatively couple the video presentation device 102 to a network 132 and therethrough to a video streaming application 136 executing on a server 134 or other computer system and to a video content data store 138. Computer systems are described further hereinafter. The network 132 comprises one or more private networks, one or more public networks, or a combination thereof. The cell site 130 may be considered to be a part of the network 132 but is shown separately to facilitate clear description of the interactions between the video presentation device 102 and the cell site 130. While a single cell site 130 is shown in FIG. 1, it is understood that the system 100 may comprise any number of cell sites.

A user of the video presentation device 102 may purchase a cellular communication subscription associated with the eSIM **122*b* from the cellular communication service provider and install the eSIM 122*b* into the non-transitory memory 116 of the video presentation device 102. The eSIM 122*b* may be downloaded from the Internet in one way or another. For example, the video presentation device 102 may have a WiFi radio transceiver, and the user may download the eSIM 122*b* via the WiFi radio transceiver from a WiFi wireless router proximate to the video presentation device 102, where the WiFi wireless router is communicatively coupled to the Internet and/or to the network 132. The eSIM 122*b* may be provided by a traditional removable SIM card, and the user may physically insert or otherwise install the SIM card into the video presentation device 102. In an embodiment, an eSIM 122*a* may be stored on a portable electronic device 140, and the device 140 may communicate the eSIM 122*a* to the video presentation device 102 via near field communication (NFC) techniques, via WiFi, or via Bluetooth. In an embodiment, the portable electronic device 140 may be a smart phone, a wearable computer, a headset computer, a laptop computer, a notebook computer, a tablet computer, or an Internet of things (IoT) device. In an embodiment, the portable electronic device 140 may have the form factor of a fob. In an embodiment, the portable electronic device 140 may have no on-board battery or power supply and may rely on an electromagnetic field emitted by the video presentation device 102 to harvest power and to broadcast the eSIM 122*a***.

The content of the eSIM 122*a*, illustrated in FIG. 1 within the portable electronic device 140, is substantially the same as the content of the eSIM 122*b* illustrated within the non-transitory memory 116. The eSIM content can be referred to as an eSIM profile. At a point in time, the content of the eSIM 122*a* is transmitted to the video presentation device 102 and stored in the non-transitory memory 116. In an embodiment, the video presentation device 102 is enabled to employ the eSIM 122*b* when the portable electronic device 140 is located proximate to the video presentation device 102. The content of the eSIM 122*a*, 122*b* comprises a unique identifier of the eSIM profile called an ICCID (integrated circuit card identity), an IMSI (international mobile subscriber identity) that is a telephone number of the eSIM 122*a*, 122*b* and network access credentials. In an embodiment, the content of the eSIM 122*a*, 122*b* may not include an IMSI, because the cell site 130 and the RAN does not need to page the video presentation device 102 or provide traditional mobility management for the video presentation device 102, because the video presentation device 102 is statically located. Said in other words, the video presentation device 102 is not mobile and hence the cell site 130 and the RAN do not need to conduct cellular radio link handoffs among cell sites. Additionally, because the video presentation device 102 alone initiates establishment of the cellular radio communication link 128, there is no need for the RAN or the network 132 to maintain an entry in a home location register (HLR) or in a visitor location register (VLR) to support paging the video presentation device 102 to receive an incoming call. It is understood that the video presentation device 102 may occasionally be moved albeit it is typically statically located. For example, the video presentation device 102 may be located in one location for a year, two years, three years in a same home; the owners of the video presentation device 102 may sell their home and buy a new home; and the video presentation device 102 may then be relocated to the new home where it will be statically located for an extended period of time.

A user may employ a user interface provided by the video presentation device 102 to initiate a video presentation session, for example via a remote-control functionality provided by the video presentation device 102. In response to the user input, the video presentation device 102 executes the cellular radio link application 120 (i.e., link application 120). The link application 120 commands the cellular radio transceiver 118 to establish the first cellular radio communication link 128 with the cell site 130. The cellular radio transceiver 118 sends network credentials stored in the eSIM 122*b* to the cell site 130, and the cell site 130 authenticates and authorizes the video presentation device 102 based on the network credentials provided by the cellular radio transceiver 118. The cell site 130 then establishes the first cellular radio communication link 128 with the cellular radio transceiver 118 via the antenna 119. The cell site 130 and/or the RAN and/or network elements within the network 132 determine that the network credentials provided by the video presentation device 102 are associated with a cellular communication subscription account in good standing and that the video presentation device 102 is authorized to use the video content streaming service functionality of the cell site 130 and RAN. Authorization of the video presentation device 102 to access specific video content is a separate matter and may be performed by video content providers, for example by the video streaming application 136.

With the first cellular radio communication link 128 established, the cellular radio link application 120 communicates via the first cell site 130 and via the network 132 with the video streaming application 136 to request a specific video content. The video streaming application 136 may first authenticate and authorize the video presentation device 102 for access to the requested specific video content. The authentication and authorization performed by the video streaming application 136 is considered an application layer functionality while the main focus of this disclosure is at a lower layer, for example at a physical layer/data link layer/network layer functionality. The video streaming application 136 accesses the selected video content from the video content data store 138 and streams the video content via the network 132 and the first cell site 130 over the first cellular radio communication link 128 to the video presentation device 102. Alternatively, in an embodiment, after the video streaming application 136 authenticates and authorizes the video presentation device 102, the video streaming application 136 enables the video presentation device 102 to directly access the video content from the video content data store 138, and the video streaming application 136 drops out of the video streaming session. The video presentation device 102 presents the streamed video content on the display 115. It is understood that the system 100 may comprise any number of different video streaming applications 136 executing on different severs 134 and any number of different video content data stores 138.

The action of streaming video content entails flowing video content from the video content data store 138 via the network 132, via the cell site 130, and via the first cellular radio communication link 128 to the cellular radio transceiver 118 at the same time that the video presentation device 102 is actively presenting video content on the display 115. The video content presentation device 102 may receive at least some of the video content and store in a local cache before starting presentation of video content on the display 115 (e.g., an initial 5% or 10% of the selected video content, for example a movie or a video of a sporting event that has already completed), whereby to provide a buffer to smooth out data throughput jitter and/or latency via the first cellular radio communication link 128 and/or data throughput jitter and latency in the network 132.

In an embodiment, the eSIM 122*a* may be operable for installing and using in a plurality of different video presentation devices, for example in a second video presentation device 142 or other video presentation devices. This ability to migrate the same eSIM profile, as stored as the eSIM 122*a* in the portable electronic device 140, among a plurality of different video presentation devices may provide benefits in a variety of different use scenarios. For example, a plurality of different video presentation devices may be present in a residential house. A subscriber having a video streaming cellular communication subscription account may desire to use the same subscription to stream video content to any of a plurality of video presentation devices at different times. For example, at a first time, the subscriber may watch a movie on the video presentation device 102 configured with the eSIM 122*b* in his living room; at a second time, the subscriber's wife may watch an on-line video demonstrating a sewing technique on the second video presentation device 142 having a second cellular radio transceiver 144 and having the eSIM profile installed into the eSIM 122*c*, for example based on the second video presentation device 142 establishing a second cellular radio communication link 146 with the cell site 130; and at a third time, the subscriber may watch a football game on a third video presentation device configured with the eSIM profile from the portable electronic device 140 in a garage/workshop, based on the third video presentation device establishing a third cellular radio communication link with the cell site 130.

At any single time, only one of the three video presentation devices may be enabled to use the eSIM profile of the eSIM 122*a* to establish a cellular radio communication link with the cell site 130. In an embodiment, the cellular radio communication link application 120 may enable the eSIM 122*b* only when the portable electronic device 140 is detected to be proximate to the video presentation device 102. When the portable electronic device 140 is not detected to be proximate to the video presentation device 102, the video presentation device 102 (e.g., the link application 120 executing on the processor 114) disables the eSIM profile of the eSIM 122*b* or even deletes the eSIM profile from the eSIM 122*b*. Corresponding cellular radio communication link applications installed on the second video presentation device and the third video presentation device may similarly detect the proximity of the portable electronic device 140 and enable or disable the eSIM profile in a like manner.

In an embodiment, the portable electronic device 140 is configured to store one or more biometric of a user(s) of the video presentation device(s) associated with a video streaming service cellular communication subscription. The user can input his or her biometric signature to the portable electronic device 140, and the device 140 can store that biometric signature. Later, when the user wishes to use the video presentation device 102 to view video streamed by the cell site 130, the portable electronic device 140 can challenge the user to input his or her biometric signature. The portable electronic device 140 can compare the input biometric signature to the stored biometric signature. If the biometric signatures match, the portable electronic device enables the video presentation device 102 to use the eSIM 122*b*; if the biometric signatures do not sufficiently match, the portable electronic device 140 disables the video presentation device 102 to use the eSIM 122*b*. The biometric signature can be a fingerprint scan, a face scan, a voice scan. The portable electronic device 140 may incorporate a fingerprint scanning input device a camera, and/or a microphone to receive the biometric signature input.

Another use scenario may be an office where multiple different users are provided with different eSIM profiles that may be used to access video presentation devices (e.g., teleconference devices) statically located in conference rooms within the office. The video presentation devices may be programmed to observe a schedule for permitting access to users. For example, a first user having first eSIM profile in his portable electronic device may be scheduled for using the video presentation device in first conference room from 9 am to 10 am. A second user having a second eSIM profile in her portable electronic device may be scheduled for using the same video presentation device in the first conference room from 10 am to 11 am. The video presentation device will not allow the first eSIM profile to be installed or to be operable to establish a cellular radio link with a cell site during any time except from 9 am to 10 am; and the video presentation device will not allow the second eSIM profile to be installed or to be operable to establish a cellular radio link with a cell site during any time except 10 am to 11 am.

Figure 2A:
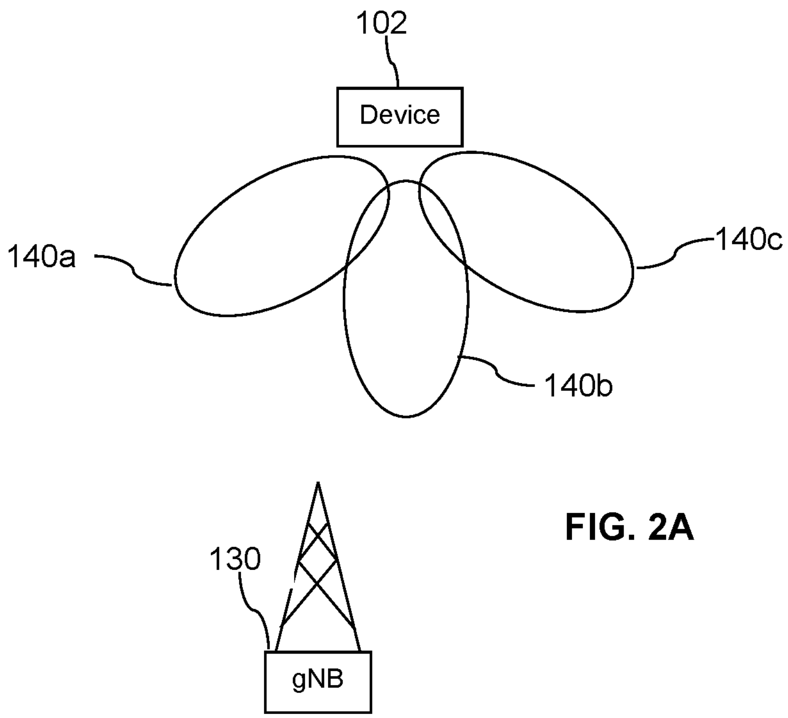
FIG. 2A and FIG. 2B are illustrations of an antenna beam adaptation process according to an embodiment of the disclosure.
Figure 2B:
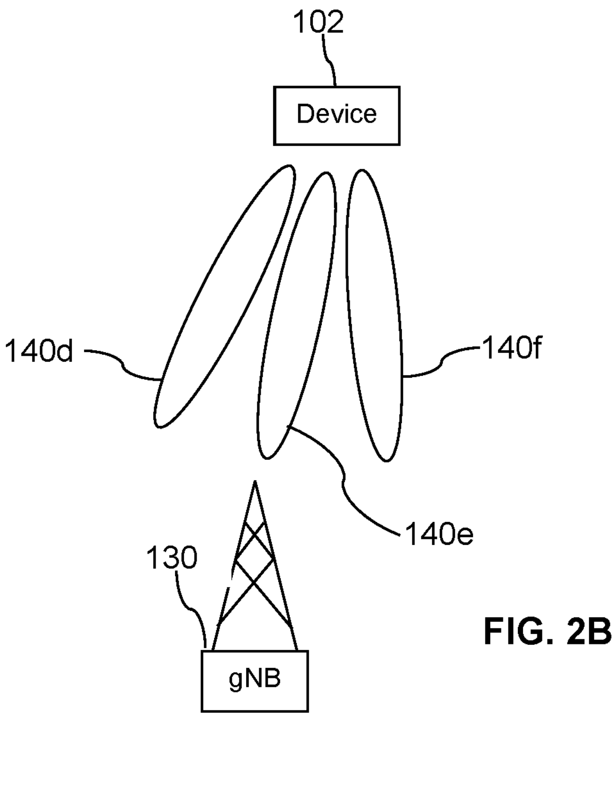

Turning now to FIG. 2A and FIG. 2B, an antenna parameter adaptation process is described. In an embodiment, the cellular radio communication link application 120 may conduct an antenna parameter adaptation operation and store the antenna parameters 124 in the non-transitory memory 116. The antenna parameter adaptation process may be conducted upon initial installation of the video presentation device 102. The antenna parameter adaptation process may be conducted periodically after completing the initial adaptation process, for example once per week, once every two weeks, once every month, once every two months, once every three months, or on some other periodic schedule. In an embodiment, the cellular radio communication link application 120 may at any time run the antenna parameter adaptation process, for example upon detecting that a received signal strength of the cell site 130 and/or of the first cellular radio communication link 128 drops below a threshold strength. The link application 120 may run the antenna adaptation process when the cell site 130 is not detected, for example when the video presentation device 102 is relocated (e.g., when a family moves from one home to a new home and relocates the device 102 to their new home). In an embodiment, the user may command the video presentation device 102 to perform the antenna parameter adaptation process at any time. Repeating the antenna parameter adaptation process may be desirable when the local radio environment of the video presentation device 102 changes, for example as seasonal variation in foliage occurs, as seasonal variation in cellular communication occurs, or as buildings are constructed or demolished.

The video presentation device 102 desirably establishes the first cellular radio communication link 128 with the cell site 130 using a narrowly focused beam of the antenna 119. Antennas are reciprocal devices, meaning they receive and transmit in the same sense. By employing a narrowly focused bean of the antenna 119 that is directed and/or steered accurately towards the cell site 130, the gain of the antenna 119 is increased, and the cell site 130 is enabled to transmit to the video presentation device 102 with less radio power than would be needed if the antenna were configured for omnidirectional operation. Transmitting with less radio power conserves electric power and reduces emission of greenhouse gases. Transmitting less radio power from the cell site 130 to the video presentation device 102 also reduces radio noise to other cell sites and/or to adjacent cellular radio links. In an embodiment, the antenna 119 is configurable with antenna parameters 124 that adapt the beam of the antenna 119. In an embodiment, the antenna 119 may be an antenna array that is able to be electronically configured with the antenna parameters 124 by the cellular radio communication link application 120 to focus and direct and/or steer a beam of the antenna 119.

As shown in FIG. 2A, initially the link application 120 may configure the antenna 119 with antenna parameters 124 that result in a broad antenna beam. At first, the link application 120 may sweep the broad antenna beam horizontally in 360 degrees around the video presentation device 102 to coarsely locate the direction of the cell site 130. Note that the "direction" of the cell site 130 may not be the actual physical direction to the cell site 130 but in the direction from which the signal transmitted by the cell site 130 is received most strongly by the antenna 119, which in some circumstances may deviate from the actual physical location of the cell site 130. A shown in FIG. 2B, when the cell site 130 is coarsely located, the link application 120 may adapt the antenna parameters to focus the antenna 119 in a tighter beam and sweep the narrow antenna beam horizontally in a narrower angular range (e.g., +60 degrees to one side and −60 degrees to the other side of a given direction) to more finely locate the direction of the cell site 130. The link application 120 may yet further adapt the antenna parameters to focus the antenna 119 in a still tighter beam. Through this process of successive adaptation, a set of adapted antenna parameters 124 may be automatically determined by the link application 120 and stored in the non-transitory memory 116.

In an embodiment, the link application 120 may also determine a direction from the cell site 130 to the video presentation device 102 and store this direction information. Later, when requesting attachment to the cell site 130, the link application may send this direction information to the cell site 130, whereby the cell site 130 can more readily determine where the video presentation device 102 is located relative to the cell site 130 and select an appropriate cell sector with which to communicate with the video presentation device 102. In an embodiment, the cell site 130 may use this direction information to narrowly focus and to steer a beam of a cell site antenna towards the video presentation device 102.

With reference again to FIG. 1, the video presentation device 102 does not need to maintain the first cellular radio communication link 128 continuously when video content is not being presented on the display 115. When selected video content has been presented, and after a pre-determined idle time threshold, the link application 120 may detach from the cell site 130, taking down the first cellular radio communication link 128, thereby releasing limited wireless spectrum resources for alternative use, such as use for voice call communications. In an embodiment, the pre-determined idle time threshold may be 1 minute, 2 minutes, 5 minutes, 10 minutes, 15 minutes, or some other time duration less than 1 hour. When the video presentation device 102 is turned off, the link application 120 likewise can detach from the cell site 130.

In an embodiment, the link application 120 may inform the cell site 130 of a desired quality of service (QOS) of the first cellular radio communication link 128 based on the nature of the selected video content. In an embodiment, the desired QoS may depend on a selected video stream application 136 and/or video content source. This designation of the desired QoS by the link application 120 may also help conserve resources of the cell site 130 and/or of the network 132. For example, some video content may be less affected by increased jitter or latency, and thus the link application 120 accordingly may stipulate a reduced QoS requirement. The link application 120 may adapt its QoS requirements based on a particular application that is executing on the video presentation device 102, for example a gaming application, a first video streaming application, a second different video streaming application, etc. It is understood that different applications executing on the video presentation device 102 may be associated with different QoS requirements.

The link application 120 may adapt its QoS requirements based on user input. For example, if a user indicates to the video presentation device 102 that he wants to watch a selected video in 15 minutes, the link application 120 may stipulate a lower QoS than if the user indicates he wants to watch the selected video immediately. If the user wants to watch the video while eating his dinner in 15 minutes—after having heated up a TV dinner in the oven—the link application 120 can start downloading video content promptly and caching the video content, which can allow the link application 120 to buffer the streamed video and cancel out the effects of high jitter and increased latency. The user can also indicate to the video presentation device 102 how long the desired QoS is needed, for example the duration of the selected video content. The link application 120 can inform the cell site 130 of this time duration, and the cell site 130, the RAN, and the network 132 can plan resource allocation accordingly.

Figure 3A:
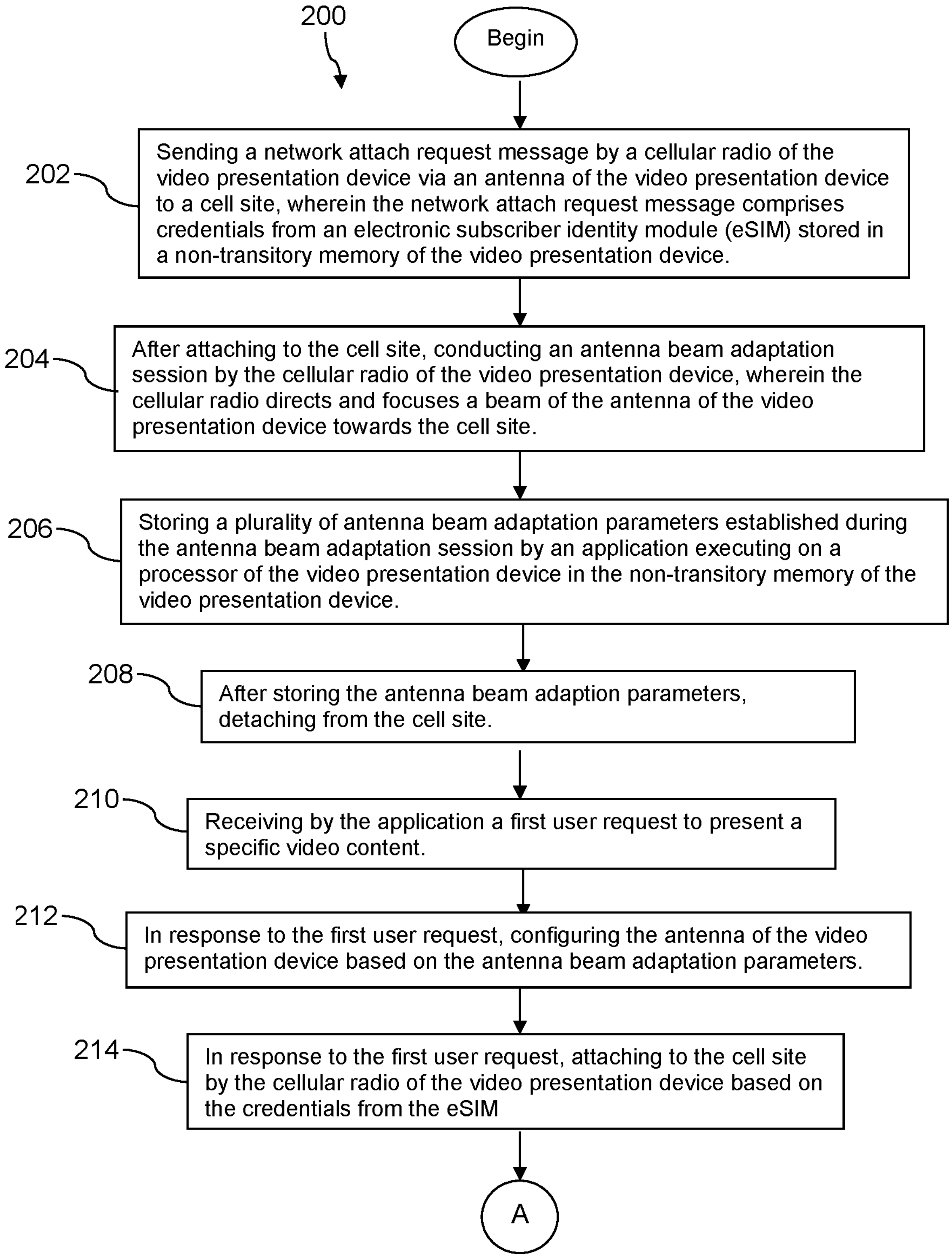
FIG. 3A and FIG. 3B are a flow chart of a method according to an embodiment of the disclosure.
Figure 3B:
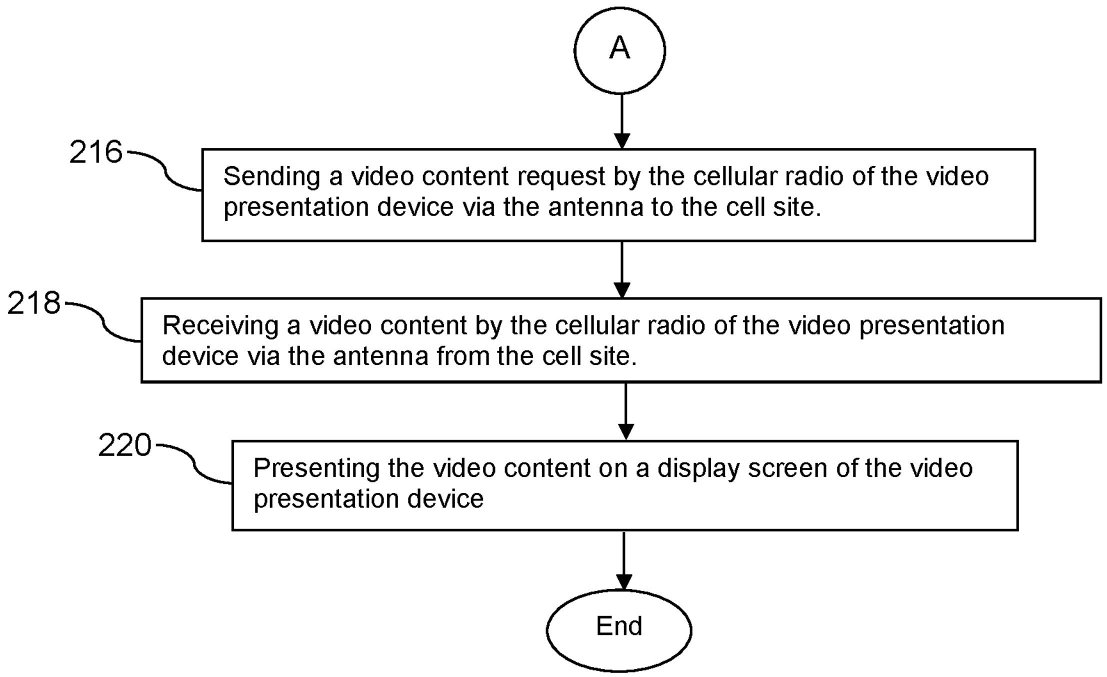

Turning now to FIG. 3A and FIG. 3B, a method 200 is described. In an embodiment, the method 200 is a method of streaming video content to a video presentation device from a cell site. At block 202, the method 200 comprises sending a network attach request message by a cellular radio of the video presentation device via an antenna of the video presentation device to a cell site, wherein the network attach request message comprises credentials from an electronic subscriber identity module (eSIM) stored in a non-transitory memory of the video presentation device.

At block 204, the method 200 comprises, after attaching to the cell site, conducting an antenna beam adaptation session by the cellular radio of the video presentation device, wherein the cellular radio directs and focuses a beam of the antenna of the video presentation device towards the cell site. At block 206, the method 200 comprises storing a plurality of antenna beam adaptation parameters established during the antenna beam adaptation session by an application executing on a processor of the video presentation device in the non-transitory memory of the video presentation device. In an embodiment, the method 200 further comprises the application storing information about a direction from the cell site to the video presentation device in the non-transitory memory, wherein attaching to the cell site after receiving the first user request comprises sending by the cellular radio of the video presentation device to the cell site the information about the direction from the cell site to the video presentation device.

At block 208, the method 200 comprises, after storing the antenna beam adaption parameters, detaching from the cell site. At block 210, the method 200 comprises receiving by the application a first user request to present a specific video content. The user request may be provided by a keypad or buttons located on the video presentation device. The user request may be provided by a remote-control interface of the video presentation device. At block 212, the method 200 comprises, in response to the first user request, configuring the antenna of the video presentation device based on the antenna beam adaptation parameters.

At block 214, the method 200 comprises, in response to the first user request, attaching to the cell site by the cellular radio of the video presentation device based on the credentials from the eSIM. At block 216, the method 200 comprises sending a video content request by the cellular radio of the video presentation device via the antenna to the cell site. In an embodiment, the video content request comprises an indication of a desired quality of service (QOS) level. In an embodiment, the video content request comprises an indication of a time duration of the desired QoS level.

At block 218, the method 200 comprises receiving a video content by the cellular radio of the video presentation device via the antenna from the cell site. At block 220, the method 200 comprises presenting the video content on a display screen of the video presentation device. In an embodiment, the method 200 further comprises, in response to completion of the presentation of video content on the display screen of the video presentation device, detaching from the cell site by the cellular radio of the video presentation device.

In an embodiment, the method 200 further comprises periodically repeating the antenna beam adaptation session and storing a plurality of revised antenna beam parameters in the non-transitory memory. In an embodiment, the method 200 further comprises detecting that a radio signal strength of the cell site received by the cellular radio of the video presentation device is less than a pre-defined threshold; and in response to detecting the radio signal strength of the cell site received by the cellular radio of the video presentation device being less than the pre-defined threshold, repeating the antenna beam adaptation session and storing a plurality of revised antenna beam parameters in the non-transitory memory.

Figure 4:
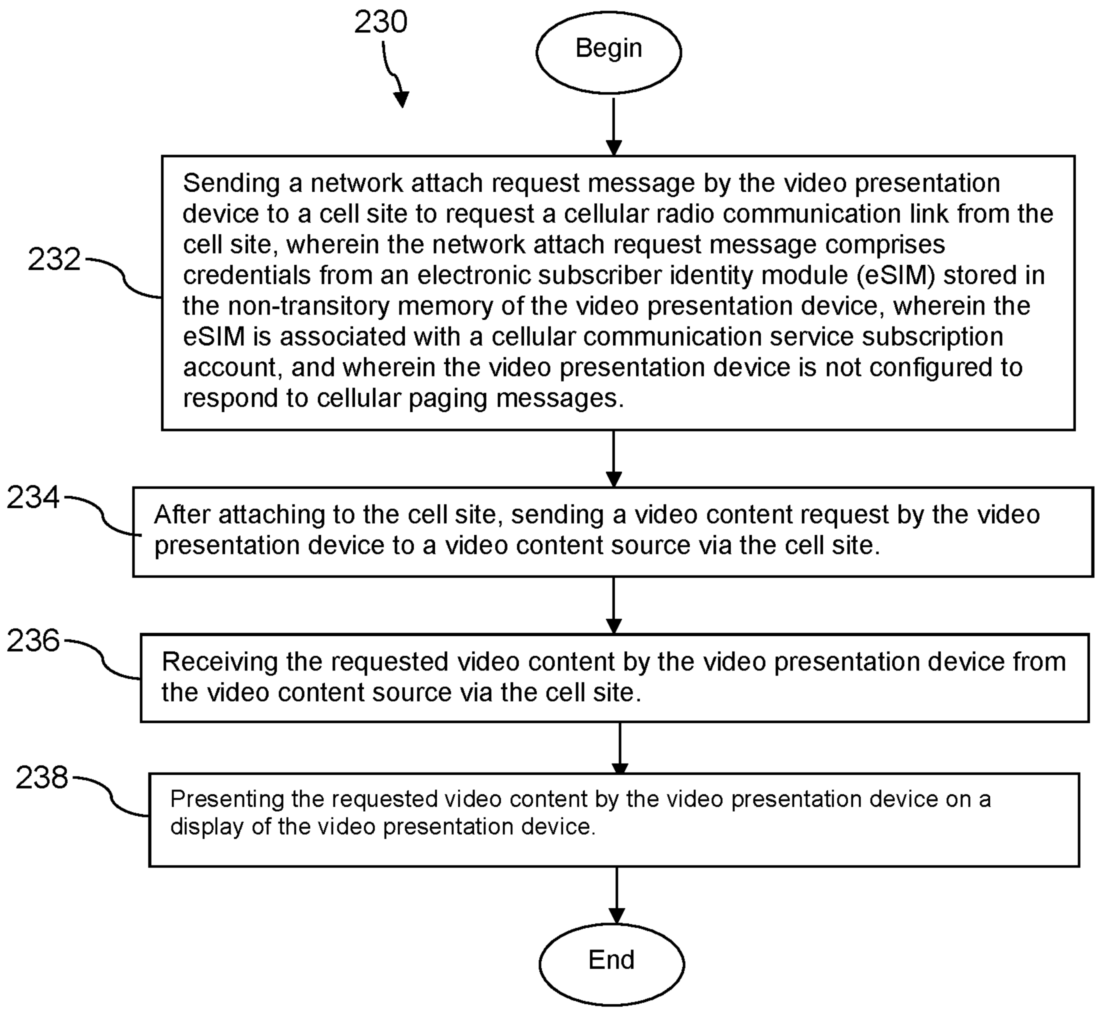
FIG. 4 is a flow chart of another method according to an embodiment of the disclosure.

Turning now to FIG. 4, a method 230 is described. In an embodiment, the method 230 is a method of streaming video content to a video presentation device from a cell site. At block 232, the method 230 comprises sending a network attach request message by the video presentation device to a cell site to request a cellular radio communication link from the cell site, wherein the network attach request message comprises credentials from an electronic subscriber identity module (eSIM) stored in the non-transitory memory of the video presentation device, wherein the eSIM is associated with a cellular communication service subscription account, and wherein the video presentation device is not configured to respond to cellular paging messages. In an embodiment, the request for a cellular radio communication link comprises a desired quality of service (QOS) level and a time duration of the cellular radio communication link.

At block 234, the method 230 comprises, after attaching to the cell site, sending a video content request by the video presentation device to a video content source via the cell site. At block 236, the method 230 comprises receiving the requested video content by the video presentation device from the video content source via the cell site. At block 238, the method 230 comprises presenting the requested video content by the video presentation device on a display of the video presentation device.

In an embodiment, the method 230 further comprises receiving an eSIM profile by the video presentation device from a portable electronic device; and storing the eSIM profile in the eSIM stored in the non-transitory memory, wherein the eSIM profile comprises the credentials. In an embodiment, the portable electronic device is a smart phone. In an embodiment, the portable electronic device is a smart watch. In an embodiment, the portable electronic device is a fob. In an embodiment, the method 230 comprises disabling the cellular radio communication link from the cell site when the presence of the portable electronic device cannot be detected.

Figure 5:
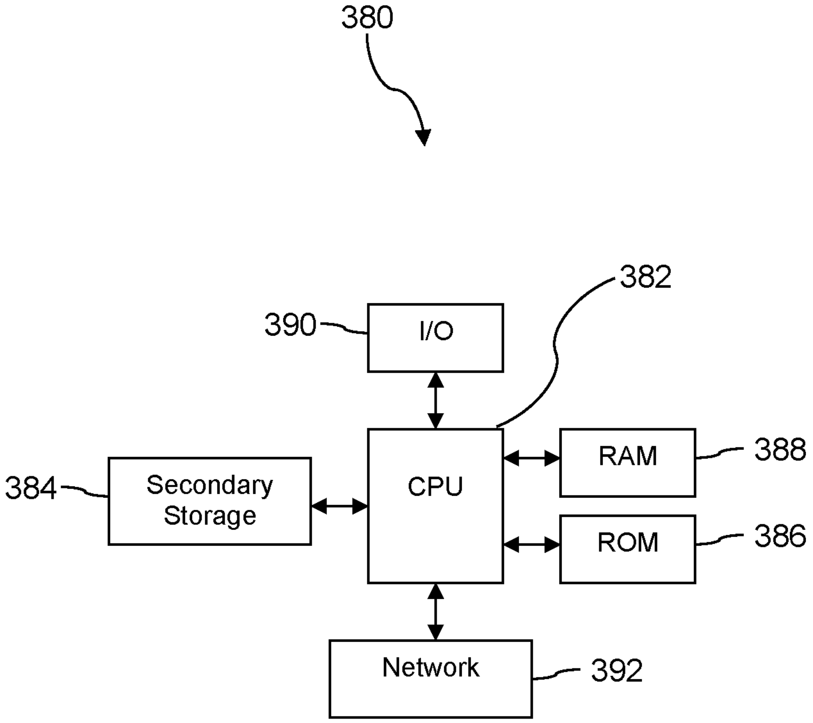
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A video presentation device having an embedded cellular radio, comprising:
- a processor;
- a non-transitory memory;
- a cellular radio antenna;
- a cellular radio transceiver;
- a display screen; and
- an application, stored in the non-transitory memory, that when executed by the processor with the video presentation device statically located:
  - determines a direction from a cell site to the video presentation device, stores the direction in the non-transitory memory,
  - sends a network attach request message via the cellular radio transceiver and the cellular radio antenna to the cell site to request a cellular radio communication link from the cell site, wherein the network attach request message comprises the direction and credentials from an electronic subscriber identity module (eSIM) stored in the non-transitory memory, and wherein the eSIM is associated with a cellular communication service subscription account,
  - after attaching to the cell site, sends a video content request to a video content source via the cellular radio transceiver and the cellular radio antenna,
  - in response to the video content request, configures the cellular antenna based on antenna beam adaptation parameters stored in the non-transitory memory,
  - receives the requested video content by the cellular radio via the cellular antenna from the cell site,
  - presents the requested video content on the display screen, and
  - in response to a prompt to release the eSIM, sends a network detach request message via the cellular radio transceiver and the cellular radio antenna to the cell site.

2. The video presentation device of claim 1, wherein the cellular radio antenna comprises an antenna array.

3. The video presentation device of claim 2, wherein the antenna array is adapted by the antenna configuration parameters to focus a beam of the antenna array towards the cell site.

4. The video presentation device of claim 1, wherein the display screen has more viewing area than 550 square inches and less than 80,000 square inches.

5. The video presentation device of claim 1, wherein the network attach request message comprises a desired quality of service (QoS) level.

6. The video presentation device of claim 1, wherein the cellular radio transceiver is configured to establish a cellular radio communication link with the cell site according to a 5G, a long-term evolution (LTE), a code division multiple access (CDMA), or a global system for mobile communication (GSM) cellular radio communication protocol.

7. The video presentation device of claim 1, wherein the application, when executed by the processor with the video device statically located:
- after detaching from the cell site, sends a second network attach request message via the cellular radio transceiver and the cellular radio antenna to the cell site to request a second cellular radio communication link from the cell site, wherein the second network attach request message comprises the direction and credentials from the eSIM stored in the non-transitory memory,
- after attaching to the cell site in accordance with the second network attach request message, sends a second video content request to the video content source via the cellular radio transceiver and the cellular radio antenna,
- receives the requested second video content, and
- presents the requested second video content on the display screen.

8. A method of streaming video content to a video presentation device from a cell site, comprising:
- sending a network attach request message by a cellular radio of the video presentation device via an antenna of the video presentation device to a cell site, wherein the network attach request message comprises credentials from an electronic subscriber identity module (eSIM) stored in a non-transitory memory of the video presentation device;
- after attaching to the cell site, conducting an antenna beam adaptation session by the cellular radio of the video presentation device, wherein the cellular radio directs and focuses a beam of the antenna of the video presentation device towards the cell site;
- storing a plurality of antenna beam adaptation parameters established during the antenna beam adaptation session by an application executing on a processor of the video presentation device in the non-transitory memory of the video presentation device;
- after storing the antenna beam adaptation parameters, detaching from the cell site;
- receiving by the application a first user request to present a specific video content;
- in response to the first user request, configuring the antenna of the video presentation device based on the antenna beam adaptation parameters;
- in response to the first user request, attaching to the cell site by the cellular radio of the video presentation device based on the credentials from the eSIM;
- sending a video content request by the cellular radio of the video presentation device via the antenna to the cell site;

receiving a video content by the cellular radio of the video presentation device via the antenna from the cell site; and presenting the video content on a display screen of the video presentation device.

9. The method of claim 8, further comprising the application storing information about a direction from the cell site to the video presentation device in the non-transitory memory, wherein attaching to the cell site after receiving the first user request comprises sending by the cellular radio of the video presentation device to the cell site the information about the direction from the cell site to the video presentation device.

10. The method of claim 8, further comprising, in response to the first user request, sending an indication of a desired quality of service (QoS) level by the cellular radio of the video presentation device to the cell site.

11. The method of claim 10, further comprising, in response to the first user request, sending an indication of a time duration of the desired QoS level by the cellular radio of the video presentation device to the cell site.

12. The method of claim 8, periodically repeating the antenna beam adaptation session and storing a plurality of revised antenna beam parameters in the non-transitory memory.

13. The method of claim 8, further comprising:

detecting that a radio signal strength of the cell site received by the cellular radio of the video presentation device is less than a pre-defined threshold; and in response to detecting the radio signal strength of the cell site received by the cellular radio of the video presentation device being less than the pre-defined threshold, repeating the antenna beam adaptation session and storing a plurality of revised antenna beam parameters in the non-transitory memory.

14. The method of claim 8, further comprising, in response to completion of the presentation of video content on the display screen of the video presentation device, detaching from the cell site by the cellular radio of the video presentation device.

15. A method of streaming video content to a video presentation device from a cell site, comprising:

sending a network attach request message by the video presentation device to a cell site to request a cellular radio communication link from the cell site, wherein the network attach request message comprises credentials from an electronic subscriber identity module (eSIM) stored in the non-transitory memory of the video presentation device, wherein the eSIM is associated with a cellular communication service subscription account, wherein the video presentation device is not configured to respond to cellular paging messages, wherein the video presentation device is not configured to receive cellular radio link handoffs among cell sites, and wherein an eSIM content of the eSIM does not include an IMSI;

after attaching to the cell site, sending a video content request by the video presentation device to a video content source via the cell site, receiving the requested video content by the video presentation device from the video content source via the cell site; and presenting the requested video content by the video presentation device on a display of the video presentation device.

16. The method of claim 15, further comprising:

receiving an eSIM profile by the video presentation device from a portable electronic device; and storing the eSIM profile in the eSIM stored in the non-transitory memory, wherein the eSIM profile comprises the credentials.

17. The method of claim 16, further comprising disabling the cellular radio communication link from the cell site when the presence of the portable electronic device cannot be detected.

18. The method of claim 16, wherein the portable electronic device is a smart phone.

19. The method of claim 16, wherein the portable electronic device is a smart watch.

20. The method of claim 15, wherein the request for a cellular radio communication link comprises a desired quality of service (QoS) level and a time duration of the cellular radio communication link.

* * * * *